_2,702,263_

PROCESS FOR RECOVERING VITAMIN B$_{12}$

Henry M. Shafer, Westfield, N. J., and Arnold J. Holland, Penn Laird, Va., assignors to Merck & Co., Inc., Rahway, N. J., a corporation of New Jersey No Drawing. Application January 25, 1954,
Serial No. 406,091

6 Claims. (Cl. 167—81)

This invention is concerned generally with the recovery from solution of vitamin substances capable of promoting the growth of the microorganism *Lactobacillus lactis* Dorner (LLD) and having "animal protein factor" (APF) activity. More particularly, it relates to a new and improved method for recovering vitamin B$_{12}$ and/or vitamin B$_{12}$-like compounds (such as vitamin B$_{12a}$) from aqueous solutions, including fermentation broths containing the same, by adsorbing the vitamin B$_{12}$ and/or vitamin B$_{12}$-like compounds from said solutions utilizing selected resinous adsorbents as the adsorbing agents.

This is a continuation-in-part of application Serial No. 186,115, filed September 21, 1950.

Vitamin B$_{12}$ is a new chemical compound fully characterized in a co-pending application of applicants' assignee, Serial No. 146,404, filed February 25, 1950, which is capable of promoting the growth of microorganism *L. lactis* Dorner, and which shows animal protein factor activity. It possesses marked and effective action in the therapeutic treatment of Addisonian pernicious anemia and other macrocytic anemias. Vitamin B$_{12}$ is ordinarily prepared by fermenting an aqueous nutrient medium by means of a vitamin B$_{12}$-producing strain of Streptomyces and subjecting the fermentation broth thus obtained to purification operations.

By vitamin B$_{12}$-like compounds are meant the red crystalline compounds (not vitamin B$_{12}$) which are obtained when a fermentation broth containing them is subjected to the purification treatment utilized in the purification of vitamin B$_{12}$ (as described on pages 13 to 16 of said application, Serial No. 146,404) but omitting the counter-current distribution procedure employed as the final step in this purification operation. These vitamin B$_{12}$-like compounds can be characterized by the fact that they are readily convertible to pure vitamin B$_{12}$ per se by treatment with cyanide ion, as described in a co-pending application of applicants' assignee, Serial No. 120,009, filed October 6, 1949, now Patent No. 2,530,416.

The recovery of vitamin B$_{12}$ and/or vitamin B$_{12}$-like compounds from aqueous solutions, such as fermentation broths containing the same, has heretofore been accomplished by treating said broths with an adsorbent material such as activated charcoal or fuller's earth which produces an adsorbate containing vitamin B$_{12}$ and/or vitamin B$_{12}$-like compounds present in the broth together with various contaminants. The adsorbate is then eluted with a suitable solvent, such as an aqueous solution of pyridine or an alkyl substituted pyridine, and the eluate evaporated thereby producing an elaboration product which contains the vitamin B$_{12}$ and/or B$_{12}$-like compounds. The elaboration product thus obtained is extracted with an elaboration solvent, such as water or a lower aliphatic water-miscible alcohol, and the resulting extract is subjected to chromatographic fractionation by adding said extract to a column of adsorbent material and washing the column with solvent, fractionally to elute the vitamin B$_{12}$ and/or vitamin B$_{12}$-like compounds from the adsorbent material.

The resulting eluate can then be further processed as set forth in the aforementioned application Serial No. 146,404 to produce pure vitamin B$_{12}$, or to produce the vitamin B$_{12}$-like substances substantially free of contaminating materials.

Thus, the preparation of a vitamin-enriched extract suitable for chromatography, starting with a fermentation broth containing vitamin B$_{12}$ and/or vitamin B$_{12}$-like compounds, previously involved the following purification operations: (1) adsorption of the vitamin B$_{12}$ and/or B$_{12}$-like compounds from fermentation broths utilizing activated carbon or fuller's earth as the adsorbing agent; (2) elution of the adsorbate with pyridine; (3) evaporation of the pyridine eluate; and (4) extraction of the elaboration product with another solvent.

While the foregoing procedure utilizing carbon as the adsorbing agent is successful in that it permits the recovery of vitamin B$_{12}$ and/or vitamin B$_{12}$-like substances from fermentation broths containing the same, from the industrial point of view it is an expensive and objectionable method. Additionally, it has been found that unduly high losses of active materials occur in processing the eluates.

Attempts have been made, using batch operation, to utilize carbon as the adsorbent followed by elution of the resulting adsorbate with a two-phase water-butanol mixture. Fuller's earth has also been used as an adsorbent for the LLD active components of fermentation broths but the use of fuller's earth has necessitated the employment of batch procedures for both the adsorption and elution steps. Such batchwise procedures, although giving improved recoveries of vitamin B$_{12}$ and like compounds, possess the objectionable features characteristic of batch operations and these procedures using carbon and fuller's earth have not proved practicable for column operation.

Prior to the present invention, there was available no practical purification process employing a resinous adsorbent to remove vitamin B$_{12}$ and/or vitamin B$_{12}$-like compounds. A number of resinous adsorbents were tried employing the usual adsorption conditions for each resinous adsorbent and all proved to be ineffective. For example, the following representative adsorbents adsorbed little or none of the desired compounds: (*a*) a cation exchange resin deriving its exchange capacity from carboxylic groups; (*b*) a cation exchange resin deriving its exchange from sulphonic groups; (*c*) an anion exchange resin deriving its exchange capacity from secondary amine groups, and (*d*) an anion exchange resin deriving its exchange capacity from secondary and tertiary amine groups. In fact, resinous adsorbents of type (*a*) were found to selectively adsorb the anti-biotic streptomycin while rejecting substantially all of the vitamin B$_{12}$ and/or B$_{12}$-like compounds.

It is now discovered, however, that vitamin B$_{12}$ and vitamin B$_{12}$-like compounds may be recovered from fermentation broths with surprising efficiency and facility utilizing as the adsorbent a substantially neutral porous decolorizing resin containing polar substituents in the form of hydroxyl or amino groupings, said resins being characterized as having little or no basic or acidic properties. These substantially neutral porous decolorizing resins (wherein the ion-exchange properties, if present, are decidedly in the background) constitute a well-recognized class of resins which have been utilized for the adsorption of by-products in the purification of glucose as described in Dutch Patent No. 64,732, issued November 15, 1949. The properties and method of preparation of these substantially neutral porous decolorizing resins are more fully disclosed in Dutch Patent No. 59,449, issued June 16, 1947 and in U. S. Patent No. 2,389,865, issued November 27, 1945. We ordinarily prefer to utilize for this purpose an amine formaldehyde resin such as Permutit DR resin, manufactured by the Permutit Co., New York. This resin possesses a highly porous structure and contains polar substituents in the form of amino groupings. The resin has a low basic dissociation constant resulting from the amino groups and thus possesses only slightly basic properties. These substantially neutral porous decolorizing amine-formaldehyde resins can be prepared, for example, in accordance with the procedures set forth in illustrative Examples I and III of Dutch Patent No. 59,449, issued June 16, 1947. Alternatively, we prefer to employ a phenolic resinous adsorbent, such as Duolite S–30 resin, manufactured by the Chemical Process Co., Redwood City, California. This resin is a porous decolorizing resin containing phenolic polar substituents. The resin has a very low acidic dissociation constant and thus shows only slightly acidic properties. These substantially neutral porous decolorizing phenolic resinous adsorbents can be prepared in accordance with procedures set forth in U. S. Patent No. 2,389,865.

As pointed out hereinabove, other resinous adsorbents (such as the ion exchange resins) were found to be ineffective for adsorbing vitamin $B_{12}$ and/or vitamin $B_{12}$-like compounds from aqueous solutions. Moreover, the herein-described neutral porous decolorizing resins containing polar substituents offer substantial advantages from the standpoint of purity of product, recovery yields and economics of operation, over carbon and fuller's earth, the only adsorbents previously utilized for adsorbing vitamin $B_{12}$ and like compounds. Whereas, with the adsorbents, carbon or fuller's earth, the adsorbing step serves merely as a concentration step after which numerous intricate purification steps are required, the product obtained directly from fermentation broths utilizing a porous decolorizing resin of the type described hereinabove as the adsorbent is relatively free from undesirable materials present in the original broth. This is evidenced by the high ultimate recoveries of vitamin $B_{12}$ which are obtained due to decreased losses in separating impurities in subsequent steps.

The vitamin $B_{12}$ and vitamin $B_{12}$-like compounds are readily eluted in substantially quantitative yield from these novel resinous adsorbates utilizing a variety of aqueous organic solutions, particularly an aqueous acidic acetone solution. Not only does this elution procedure achieve substantially quantitative elution of the vitamin $B_{12}$ and like compounds, but it accomplishes a still further purification of the product due to the selective action of the solvent which leaves adsorbed impurities in the resin. Moreover, the eluting solvents which may be employed in the present procedure are readily recovered in contrast to the expensive and troublesome recovery procedures necessary for recovering the pyridine previously utilized as the eluting solvent when carbon was employed as the adsorbent material.

The eluting solvents which we prefer to utilize in eluting the vitamin $B_{12}$ and/or vitamin $B_{12}$-like compounds from the novel resin adsorbates include a number of aqueous organic solutions which may be employed with varying degrees of efficiency. As pointed out hereinabove, the preferred eluants are aqueous acetone solutions acidified with a strong acid, that is an acid having a dissociation constant for the first hydrogen of greater than about $1 \times 10^{-3}$. We prefer to render the solution about 0.1 N with such an acid. The optimum acetone concentration lies between about 30 and 60%. Weak acids such as acetic acid may be employed but elution efficiency decreases. Instead of acetone we may utilize a number of organic solvents, such as other ketones, lower aliphatic alcohols, esters, benzyl alcohol, and the like, said organic solvents being at least partially miscible with water. Those solvents partially miscible with water are employed in amounts up to the limits of their solubilities in water. Solvents found to be of no value include toluene, benzene, chloroform, carbon tetrachloride and the like. Acid elution in the absence of a solvent is generally poor with low removal of active substances. A number of aqueous organic solvent solutions containing no acid will elute moderately well, including aqueous acetone, water saturated with n-butanol as well as aqueous ethylene glycol monoethyl ether. Some elution will also take place with aqueous methanol, aqueous ethanol, aqueous ethyl acetate and with water saturated with benzyl alcohol, although it is ordinarily preferred to employ an acidic aqueous organic solvent solution as the eluant.

Aqueous solutions of strong bases will also elute the vitamin $B_{12}$ and/or vitamin $B_{12}$-like compounds from the adsorbent but such solutions also remove considerable amounts of the adsorbed impurities. It is therefore ordinarily preferred to elute the vitamin $B_{12}$ component utilizing an aqueous organic acidic solvent solution. It has been found however, that aqueous solutions of weak bases can be employed to remove substantial amounts of adsorbed impurities while removing little or none of the vitamin $B_{12}$ and/or vitamin $B_{12}$-like compounds. We have found it useful to precede the elution of active substances by prewashing the adsorbate with a solution such as an aqueous solution containing about 1% alkali metal carbonate and 0.1% alkali metal nitrite. With this added treatment, the eluates obtained employing the preferred eluants contain even less impurities.

The novel adsorption and elution procedure utilizing the herein disclosed, substantially neutral porous decolorizing resins containing polar substituents as the adsorbent can be employed generally for recovering LLD and APF-active substances from aqueous solutions. It is particularly useful for recovering vitamin $B_{12}$ and vitamin $B_{12}$-like substances from fermentation broths produced by fermenting aqueous nutrient mediums by means of selected strains of microorganisms of the subphylum Fungi, which are capable of producing vitamin $B_{12}$ and/or vitamin $B_{12}$-like substances, and in particular strains of Streptomyces, Mycobacterium, Pseudomonas, Alternaria, and the like.

In carrying out the adsorption operation, where the resin adsorbate is utilized for the first time, it has been found best to condition the resin prior to the adsorption operation. For example, when Duolite S-30 is employed, the resin is placed in a column and washed with aqueous alkaline solution. About one gallon of 2% aqueous sodium hydroxide solution per pound of resin is usually employed and this solution is passed through the column at a contact time (volume of resin in cc. divided by rate of flow in cc. per minute) of about 25-30 minutes. Treatment of the Duolite S-30 with alkali causes the resin to change in color from tan to purple. The alkaline wash is followed by a water wash, about two gallons per pound of resin at the same contact time. It has been found advantageous to follow the water wash with an acid wash, employing about 0.8 gallon of 2% aqueous hydrochloric acid solution per pound of resin, and at a contact time of about fourteen minutes. Treatment of Duolite S-30 with acid causes the resin to change in color from purple to tan. The acid wash is followed by a second water wash, about one gallon per pound of resin at a contact time of fourteen minutes. A second alkaline wash, as described above, is given to the resin and this is followed by a water-wash at about 25-30 minutes' contact time until the pH of the effluent is about 7-8. As noted hereinabove this preliminary treatment is referred to as "conditioning" the resin. The resin is then suitable for use in adsorption. The resin pH is not important, since it adjusts quickly to that of the solution being treated.

The solution to be treated may be contacted with the resin by batch mixing, but it is much more advantageous to operate by passing the solution through a column of resin. The direction of flow through the column may be either upward or downward. In column operation, it appears to be preferable to employ resin of particle size about 20-60 mesh for optimum hydraulic efficiency. Fermentation broth to be treated is preferably at a pH of about 5-8 to avoid the possibility of decomposition of active substances at higher and lower pH's. The pH is not, however, critical as regards the efficiency of adsorption.

As is usual in most resin operations, considerable latitude is allowable in the selection of operating conditions, such as quantities and flow rates. These conditions are both functions of the solutions treated and of economic considerations, such as volumes to be processed and equipment and space requirements. Consequently, at the initiation of operations and/or when processing a new solution, a certain amount of experimentation is desirable for establishing optimal conditions. In general, the amount of solution that can be processed with a given quantity of resin decreases as the number of undesired substances present in the solution increases. The types of undesired substances present is also a factor. In adsorption, it may be said that the percentage of adsorption increases with the contact time, up to a certain point, and resin requirements decrease with increased contact time. In elution, eluant requirements decrease with increased contact time, up to a certain point, with corresponding increases in the concentration of active substances in the eluates.

Inasmuch as the broths produced by the fermentation of *Streptomyces griseus* are presently among the most important of the solutions containing vitamin $B_{12}$ and/or vitamin $B_{12}$-like compounds, the preferred conditions in the treatment of such a broth with Duolite S-30 are set forth as illustrative. It will be understood that these conditions can be varied considerably and yet provide a practicable process. *S. griseus* fermentation broth as presently prepared ordinarily exhibits on the order of 2,000–10,000 units per cc. of LLD activity, assayed employing *L. lactis* Dorner as a test organism and vitamin $B_{12}$ as a standard. For most efficient operation, it is preferred to employ in column operation a feed volume of about 45–50 gallons of broth per pound of resin at a contact time of about ten minutes (a flow rate of about 0.026 gallon per minute per pound of resin; regenerated Duolite S–30 resin has a bulk density of about 3.86 pounds per gallon). Under these conditions and employing broth of about 6000 units per cc. of LLD activity, there results about 20–25% cumulative breakthrough (LLD activity remaining in the column effluent). The active substances in the effluent from the column are recovered by passing the effluent through a second resin column. Alternatively, two or more columns can be operated in series, alternately eluting and regenerating individual columns as they approach saturation. After adsorption, the column is washed with about 1.5 gallons of water per pound of resin at a contact time of about ten minutes. The wash displaces the last of the broth and removes highly pigmented impurities which may interfere in subsequent purification operations. Alternatively, adsorption and displacement of broth with water is followed by a column wash with about 0.5 gallon per pound of resin, of an aqueous solution containing 1% alkali metal carbonate and 0.1% alkali metal nitrite, at a contact time of about sixty minutes. This wash removes pigmented impurities and desorbs the majority of the remaining colored impurities, rendering them elutable with water. The column is then washed with about 2.5 gallons of water per pound of resin at a contact time of about ten minutes.

In eluting the foregoing adsorbate, we generally employ for elution about one gallon per pound of resin of the preferred eluant, acidified aqueous acetone, at a contact time of about 20–60 minutes. The quantity of eluant necessary is determined by observing the elution: after the water is displaced from the column, a light yellow or brown forerum is collected until the eluate becomes dark, red-black. This color signals the start of rich eluate which is collected separately until the color changes to light yellow or brown, when the tail cut starts and is collected separately. (A similar eluate color change occurs in the elution of Permutit DR from yellow, to brownish-red to yellow.) With the preferred eluants, it has been found that only negligible amounts of active substances are present in the forerun and tail cut, so that only the rich eluate need be utilized. The last of the eluant is displaced from the column with water.

The resin is then regenerated by washing with an aqueous alkaline solution. We prefer to wash the column with about one gallon per pound of resin of 2% sodium hydroxide solution, at a contact time of about 25–30 minutes. The column is then washed with water until the pH of the effluent is about 7–8, at which point the column is ready for re-use in adsorption.

The following examples illustrate methods of carrying out the present invention, but it is to be understood that these examples are given by way of illustration and not of limitation.

*Example 1*

In each of two 2" I. D. glass columns connected in series was placed 2500 cc. of 20–60 mesh Duolite S–30 resin, a neutral porous decolorizing phenolic resinous adsorbent having practically no ion-exchange capacity and containing phenolic polar substituents, which can be prepared in accordance with the procedure set forth in U. S. Patent 2,389,865. The resin was being used for the first time for adsorption of LLD-active substances and was previously conditioned with alternate alkali and acid washes, finally being washed with water to pH 4–5, after an acid wash.

One hundred gallons of streptomycin fermentation broth at pH 6.2, previously treated to remove streptomycin, was assayed using *L. lactis* Dorner as the test organism and vitamin $B_{12}$ as the standard and was found to have about 5800 units per cc. of activity (11,000 units≈1 microgram of vitamin $B_{12}$), or a total of about $21.9 \times 10^8$ LLD units of activity. The broth was passed in upward flow through the two columns in series, at an overall contact time of about twenty minutes (about 250 cc./min.). The last of the broth was displaced from the column with water. The effluent was assayed and found to contain a total of about $2.8 \times 10^8$ units of LLD activity. Thus, about $19.1 \times 10^8$ units of activity (87.2%) were adsorbed on the columns. The columns were then washed in series with about fifteen liters of water at an overall contact time of about twenty minutes. The wash was assayed and found to show negligible LLD activity.

Each column was then eluted separately with 40% water–60% acetone (by volume made 1.0 normal with hydrochloric acid, at a contact time of about twenty minutes. About 6100 cc. of rich eluate was collected from the first column and about 6900 cc. from the second column. The total activity in the rich eluate cuts was about $18.7 \times 10^8$ units of LLD activity, about 98% of that adsorbed.

*Example 2*

In each of two 1⅛" I. D. glass columns connected in series was placed 100 cc. of 20–60 mesh Duolite S–30 resin, a neutral porous decolorizing phenolic resinous adsorbent having practically no ion-exchange capacity and containing phenolic polar substituents, which can be prepared in accordance with the procedure set forth in U. S. Patent 2,389,865. The resin had previously been used for adsorption of LLD-active substances and was afterwards regenerated by washing with alkali, acid and water to pH 4–5.

Six liters of streptomycin fermentation broth at pH 6.3, previously treated to remove streptomycin, was assayed using *L. lactis* Dorner and was found to have about 8200 units per cc. of activity, or a total of about $49.2 \times 10^6$ LLD units of activity. To the broth was added 0.75 mg. of radioactive vitamin $B_{12a}$, giving 18,000 counts per minute, measured with a radiation counter. The total LLD activity after this addition was about $55.1 \times 10^6$ units.

The broth was then passed in downward flow through the two columns in series, at an overall contact time of about 35–40 minutes (about 5–6 cc./min.). The last of the broth was displaced from the column with water. The effluent was assayed for LLD activity, and its radioactivity was measured. The results showed that 95% of the LLD-active substances and 91% of the radioactive material were adsorbed on the columns. The columns were then washed in series with about 2½ liters of water at an overall contact time of about twenty minutes.

Each column was then eluted separated with 40% water–60% acetone (by volume) made 0.1 normal with hydrochloric acid, at a contact time of about 60–75 minutes. The volume of eluant for the first column was about 600 ml., of which about 315 ml. was collected as rich cut. The volume of eluant for the second column was about 500 ml. of which about 200 ml. was collected as rich cut. The rich cuts were assayed for LLD activity, and their radioactivities were measured. The results showed that substantially all of the LLD-active and radioactive substances adsorbed were removed in the rich cuts. The ratio of activity found in the rich cut from the first column to activity found in the rich cut from the second column was about 10 to 1 for each type of activity.

When the above procedure was repeated employing streptomycin fermentation broth to which had been added radioactive vitamin $B_{12}$, it was likewise found that the absorption and elution efficiencies were high, both when calculated on the basis of LLD activity measurements and on the basis of radioactivity measurements. Thus, it was found that this procedure is very effective for separating LLD-active substances, and in particular vitamin $B_{12}$ and the vitamin $B_{12}$-like compound, vitamin $B_{12a}$, from fermentation broths.

*Example 3*

Fifty gallons of streptomycin fermentation broth (pH 6.2), from which the streptomycin had been removed and having a total LLD activity of $5.5 \times 10^8$ units, was passed through 3900 cc. of Duolite S–30 resin, a neutral porous decorolizing phenolic resinous adsorbent having practically no ion-exchange capacity and containing phenolic polar substituents, which can be prepared in accordance with the procedure set forth in U. S. Patent 2,389,865 (pH 8), placed in one 1" column (1400 cc.) and one 2" column (2500 cc.), in series and in downward flow. The overall contact time was about 28 minutes. After water washing, about 75% of the activity was found to have been retained on the columns.

Each column was then eluted separately with 40% water–60% acetone at a contact time of about twenty minutes. About 2150 cc. of rich eluate was collected from the first column and about 1340 cc. from the second column. The total activity in the rich eluate cuts was about 95% of that adsorbed.

Example 4

Five gallons of streptomycin fermentation broth (pH 7.4), from which the streptomycin had been removed and having a total LLD activity of $1.1 \times 10^8$ units, was passed through 154 cc. of Duolite S-30 resin, a neutral porous decolorizing phenolic resinous adsorbent having practically no ion-exchange capacity and containing phenolic polar substituents, which can be prepared in accordance with the procedure set forth in U. S. Patent 2,389,865, (pH 8) placed in a 1" column, in downward flow. The contact time was about 5½ minutes. After water washing, about 73% of the activity was found to have been retained on the column.

The column was then eluted with water saturated with N-butanol at a contact time of about eleven minutes. About 950 cc. of rich eluate was collected from the column. The activity in the rich eluate cut was about 55% of that adsorbed.

Example 5

Three 1" columns each containing 154 cc. of Duolite S-30 resin, a neutral porous decolorizing phenolic resinous adsorbent having practically no ion-exchange capacity and containing phenolic polar substituents, which can be prepared in accordance with the procedure set forth in U. S. Patent 2,389,865, (pH 8) were arranged in parallel. A separate five-gallon quantity of streptomycin fermentation broth (pH 6.5), from which the streptomycin had been removed and having a total LLD activity of $5.2 \times 10^7$ units, was passed through each column in downward flow. The contact time in each case was about 5 minutes. After water washing, about 84%, 82% and 82% of the activity was found to have been retained on columns 1, 2 and 3, respectively.

Each column was then eluated with a different solution, No. 1 with 40% water-60% acetone made 0.1 normal with hydrochloric acid, No. 2 with water saturated with n-butanol made 0.1 normal with hydrochloric acid, and No. 3 with 40% water-60% acetone made 0.1 normal with phosphoric acid. The contact time in each case was about ten minutes. About 455 cc., 620 cc. and 365 cc. of rich eluate was collected from columns 1, 2 and 3, respectively. The activity in the rich eluate cut was about 96%, 78% and 98% of that adsorbed for columns 1, 2 and 3, respectively.

An additional run showed that elution with 70% water-30% acetone made 0.1 normal with phosphoric acid was about as effective as the above 40% water-60% acetone-phosphoric acid elution.

Example 6

Two 1" columns each containing 154 cc. of Duolite S-30 resin, a neutral porous decolorizing phenolic resinous adsorbent having practically no ion-exchange capacity and containing phenolic polar substituents, which can be prepared in accordance with the procedure set forth in U. S. Patent 2,389,865, (pH 8) were arranged in parallel. A separate five-gallon quantity of streptomycin broth (pH 6.2), from which the streptomycin had been removed and having a total LLD activity of $6.1 \times 10^7$ units, was passed through each column in downward flow. The contact time in each case was about five minutes. After water washing, about 84% of the activity was found to have been retained on each of columns 1 and 2.

Column No. 1 was then eluted with 40% water-60% acetone made 0.1 normal with sulfuric acid, and column No. 2 was eluted with 40% water-60% acetone made 0.1 normal with acetic acid. The contact time in each case was about ten minutes. About 400 cc. of rich eluate was collected from column 1 and about 300 cc. from column 2. The activity in the rich eluate cut was about 100% of that adsorbed for column 1 and about 70% of that adsorbed for column 2.

Example 7

Fermentation broths were prepared by propagating three additional representative members of the Fungi capable of producing LLD and APF active substances: (1) *Mycobacterium smegmatis*, (2) *Pseudomonas lumichroma* (a new species of Pseudomonas capable of oxidizing riboflavin to lumichrome) and (3) *Alternaria* species. Each broth at about pH 7 was passed in downward flow through a 1⅛" column containing 100 cc. of Duolite S-30 resin, a neutral porous decolorizing phenolic resinous adsorbent having practically no ion-exchange capacity and containing phenolic polar substituents, which can be prepared in accordance with the procedure set forth in U. S. Patent 2,389,865, at about pH 5. The resin had previously been regenerated by washing with alkali, acid, and water. The broth contact time in each case was about thirty-three minutes. The broth volumes and total LLD activities were: (1) 3000 cc. and $10.8 \times 10^6$ units, (2) 2925 cc. and $19.3 \times 10^6$ units, and (3) 2625 cc. and $12.3 \times 10^6$ units. After water washing almost all of the activity was found to have been retained on the column in each case.

Each column was then eluted with 40% water-60% acetone made 0.1 normal with hydrochloric acid, at a contact time of about fifty minutes. The rich eluate volumes and approximate percentages of adsorbed activity present in the rich eluates were: (1) 250 cc. and 50%, (2) 300 cc. and 65%, and (3) 270 cc. and 50%. (Optimum conditions were not established for these broths.)

Example 8

In a 1⅛" I. D. glass column was placed 100 cc. of about 20-60 mesh Permutit DR resin, a neutrol porous decolorizing amine formaldehyde resin having practically no ion-exchange capacity and containing polar substituents in the form of amino groupings, which can be prepared in accordance with the procedures set forth in Dutch Patent 59,449, at pH 8. Fifteen liters of streptomycin fermentation broth at pH 7.2, previously treated to remove streptomycin, was assayed and was found to have about 2800 units per cc. of LLD activity, or a total of about $42 \times 10^6$ units of activity. The broth was passed in downward flow through the column of resin, at a contact time of about ten minutes. The broth was followed by a water wash of 500 cc. The combined broth effluent and wash contained a total of about $5.2 \times 10^6$ units of activity. Thus, about $36.8 \times 10^6$ units of activity (87.5%) were adsorbed on the column.

The column was then eluted with 40% water-60% acetone made 0.1 normal with hydrochloric acid, at a contact time of about twenty minutes. About 1080 cc. of rich eluate was collected and assayed. The total activity in the rich eluate was about $36.7 \times 10^6$ units of LLD activity, about 100% of that adsorbed.

Example 9

Forty liters of streptomycin fermentation broth at pH 6.3, previously treated to remove streptomycin, was found on assay to have a total of about $325 \times 10^6$ LLD units of activity, equivalent to the activity of about 29.6 mg. of vitamin $B_{12}$. To the broth was added 4.34 mg. of radioactive vitamin $B_{12}$.

The broth was then adsorbed on and eluted from 400 cc. of Duolite S-30 resin, a neutral porous decolorizing phenolic resinous adsorbent having practically no ion-exchange capacity and containing phenolic polar substituents, which can be prepared in accordance with the procedure set forth in U. S. Patent 2,389,865, in the manner described in Example 2. Rich eluate fractions were combined, adjusted to pH 7-8, concentrated and treated with potassium cyanide, as set forth in the aforementioned application, Serial No. 120,009, to convert vitamin $B_{12}$-like compounds to vitamin $B_{12}$. A portion of the resulting solution was then further purified by methods set forth in the aforementioned application, Serial No. 146,404, to produce a crystalline product weighing 14.8 mg. containing about 15% moisture, and found to be 95-100% pure vitamin $B_{12}$ on an anhydrous basis. Radioactivity measurement showed recovery of about 36.6% (the equivalent of about 1.59 mg.) of the radioactive vitamin $B_{12}$ added. The remainder of the crystalline product, about 11 mg. (moisture-free), was thus derived from the LLD-active substances present in the starting broth.

Example 10

A neutral porous decolorizing phenolic resinous adsorbent was prepared in accordance with a procedure disclosed in U. S. Patent 2,389,865 as follows: A mixture of 94 g. of phenol, 185 ml. of 37% formaldehyde solution, 2.0 g. of sodium hydroxide and 68 g. of water was heated under reflux on the water bath for a period of about 100 minutes of which time a homogeneous gel had formed. The gel was maintained at a temperature of about 95° C. for a period of 2–3 hours and was then transferred to an autoclave fitted with a glass liner. The autoclave was flushed thoroughly with nitrogen, closed, and the autoclave and its contents were heated to a temperature of 118° C. over a 15 minute period, and maintained at a temperature of 118–126° C. and equilibrium pressure for a period of about seventy minutes.

One-half gram of this cured resin was then mixed with a solution of 8.6 mg. of pure vitamin $B_{12}$ in 10 ml. of water for a period of 30 minutes. The resin adsorbate was separated from the spent solution by centrifugation and washed with two 5 ml.-portions of water. The water wash was added to the spent solution.

The resin adsorbate was eluted with one 10 ml.-portion and two 5 ml.-portions of an eluting solution consisting of 60% acetone and 40% of 0.1 N aqueous hydrochloric acid. The eluates were combined.

The vitamin $B_{12}$ contents of the starting vitamin $B_{12}$ solution, of the spent solution and washes, and of the combined eluates were determined by spectrophotometric measurement at 5500 Å. The vitamin $B_{12}$ adsorbed on the resin was calculated as the difference between that present in the starting $B_{12}$ solution and that retained in the spent solution.

A comparison of these results with those obtained in a similar experiment using Duolite S–30 resin is set forth in the following table:

| Resin | Vitamin $B_{12}$ in Starting $B_{12}$ Solution | Vitamin $B_{12}$ in Spent Solution | Vitamin $B_{12}$ Adsorbed in Resin | Vitamin $B_{12}$ Eluted from Resin |
|---|---|---|---|---|
| | Mg. | Mg. | Mg. | Mg. |
| Test Resin Prepared Above | 8.6 | 3.6 | 5.0 | 4.9 |
| Duolite S–30 | 8.6 | 1.7 | 6.9 | 5.9 |

Examination of the foregoing data shows that the vitamin $B_{12}$ recovered by elution of the test resin adsorbate was about 58% of that originally present in the starting vitamin $B_{12}$ solution as compared with a recovery yield of about 69% using the Duolite S–30 resin.

*Example 11*

A neutral porous decolorizing phenolic resinous adsorbent was prepared in accordance with a procedure disclosed in U. S. Patent 2,389,865 as follows: A mixture of 94 g. of phenol, 185 ml. of 37% formaldehyde solution, 2.65 g. of sodium hydroxide and 218 g. of water was heated under reflux on the water bath for a period of about 120 minutes at which time a homogeneous gel had formed. The gel was maintained at a temperature of about 95° C. for a period of 2–3 hours and was then transferred to an autoclave fitted with a glass liner. The autoclave was flushed thoroughly with nitrogen, closed, and the autoclave and its contents were heated to a temperature of 160° C. under a nitrogen pressure of 120–140 pounds per square inch, over a 15 minute period. The contents of the autoclave were cooled to 125° C. in 20 minutes and maintained at a temperature of 120–125° C., and 120–140 pounds per square inch nitrogen pressure, for a period of about thirty-five minutes.

One-half gram of this cured resin was then mixed with a solution of 8.6 mg. of pure vitamin $B_{12}$ in 10 ml. of water for a period of 30 minutes. The resin adsorbate was separated from the spent solution by centrifugation and washed with two 5 ml.-portions of water. The water wash was added to the spent solution.

The resin adsorbate was eluted with one 10 ml.-portion and two 5 ml.-portions of an eluting solution consisting of 60% acetone and 40% of 0.1 N aqueous hydrochloric acid. The eluates were combined.

The vitamin $B_{12}$ contents of the starting vitamin $B_{12}$ solution, of the spent solution and washes, and of the combined eluates were determined by spectrophotometric measurement at 5500 Å. The vitamin $B_{12}$ adsorbed on the resin was calculated as the difference between that present in the original $B_{12}$ solution and that retained in the spent solution.

A comparison of these results with those obtained in a similar experiment using Duolite S–30 resin is set forth in the following table:

| Resin | Vitamin $B_{12}$ in Starting $B_{12}$ Solution | Vitamin $B_{12}$ in Spent Solution | Vitamin $B_{12}$ Adsorbed in Resin | Vitamin $B_{12}$ Eluted from Resin |
|---|---|---|---|---|
| | Mg. | Mg. | Mg. | Mg. |
| Test Resin Prepared as Described in Example 11 hereinabove | 8.6 | 1.3 | 7.3 | 7.3 |
| Duolite S–30 | 8.6 | 1.7 | 6.9 | 5.9 |

Examination of the foregoing data shows that the vitamin $B_{12}$ recovered by elution of the test resin adsorbate was about 85% of that originally present in the starting vitamin $B_{12}$ solution as compared with a recovery yield of about 69% using the Duolite S–30 resin.

Various changes and modifications may be made in carrying out the present invention without departing from the spirit and scope thereof. Insofar as these changes and modifications are within the purview of the annexed claims, they are to be considered as part of our invention.

We claim:

1. The process which comprises contacting an aqueous solution containing vitamin $B_{12}$-active material with a substantially neutral porous decolorizing resin having substantially no ion-exchange capacity and containing polar substituents selected from the group consisting of hydroxyl and amino radicals thereby adsorbing said vitamin $B_{12}$-active material on said resin, and contacting the adsorbate thus obtained with an aqueous solution containing a water-miscible organic solvent selected from the group consisting of ketones, alcohols and esters thereby eluting the vitamin $B_{12}$-active material from said adsorbate.

2. The process which comprises contacting an aqueous solution containing vitamin $B_{12}$-active material with a substantially neutral porous decolorizing phenolic resinous adsorbent having substantially no ion-exchange capacity and containing phenolic polar substituents thereby adsorbing the vitamin $B_{12}$-active material on said adsorbent, and contacting the adsorbate thus obtained with an aqueous solution containing a water-miscible organic solvent selected from the group consisting of ketones, alcohols and esters thereby eluting the vitamin $B_{12}$-active material from said adsorbate.

3. The process which comprises contacting an aqueous solution containing vitamin $B_{12}$-active material with a substantially neutral porous decolorizing amine-formaldehyde resin having substantially no ion-exchange capacity and containing polar substituents in the form of amino groupings, thereby adsorbing the vitamin $B_{12}$-active material on said resin, and contacting the adsorbate thus obtained with an aqueous solution containing a water-miscible organic solvent selected from the group consisting of ketones, alcohols and esters thereby eluting the vitamin $B_{12}$-active material from said adsorbate.

4. The process which comprises contacting an aqueous solution containing vitamin $B_{12}$ with a substantially neutral porous decolorizing phenolic resinous adsorbent having substantially no ion-exchange capacity and containing phenolic polar substituents thereby adsorbing the vitamin $B_{12}$ on said adsorbent, and contacting the adsorbate thus obtained with an aqueous solution containing a water-miscible organic solvent selected from the group consisting of ketones, alcohols and esters thereby eluting the vitamin $B_{12}$ from said adsorbate.

5. The process which comprises contacting an aqueous solution containing vitamin $B_{12}$ with a substantially neutral porous decolorizing amine-formaldehyde resin having substantially no ion-exchange capacity and containing polar substituents in the form of amino groupings, thereby adsorbing the vitamin $B_{12}$ on said resin, and contacting the adsorbate thus obtained with an aqueous solution containing a water-miscible organic solvent selected from the group consisting of ketones, alcohols and esters thereby eluting the vitamin $B_{12}$ from said adsorbate.

6. The process which comprises contacting a substantially neutral porous decolorizing resin having substantially no ion-exchange capacity and containing polar substituents selected from the group consisting of hydroxyl and amino radicals with a fermentation broth containing vitamin $B_{12}$-active material, thereby adsorbing said vitamin $B_{12}$-active material on said resin, and contacting the adsorbate thus obtained with an aqueous acetone solution thereby eluting said vitamin $B_{12}$-active material from said adsorbate.

References Cited in the file of this patent

UNITED STATES PATENTS

| | | |
|---|---|---|
| 2,198,393 | Smit | Apr. 23, 1940 |
| 2,407,096 | Pfiffner | Sept. 3, 1946 |
| 2,530,416 | Wolf | Nov. 21, 1950 |

FOREIGN PATENTS

| | | |
|---|---|---|
| 876,930 | France | Aug. 24, 1942 |
| 616,278 | Great Britain | Jan. 19, 1949 |

OTHER REFERENCES

Amber-hi-Lites, No. 3, August 1949, first page (publ. by Rohm & Haas).

Kunin: Ion Exchange Resins (1950), pp. 134 and 187.